United States Patent
Balasubramanian

(10) Patent No.: US 11,606,842 B2
(45) Date of Patent: Mar. 14, 2023

(54) METHOD AND APPARATUS FOR MOCN GW AND X2 GW REALIZATIONS FOR ENTERPRISE DEPLOYMENTS

(71) Applicant: Celona, Inc., Cupertino, CA (US)

(72) Inventor: Srinivasan Balasubramanian, San Diego, CA (US)

(73) Assignee: Celona, Inc., Campbell, CA (US)

( * ) Notice: Subject to any disclaimer, the term of this patent is extended or adjusted under 35 U.S.C. 154(b) by 0 days.

(21) Appl. No.: 17/108,807

(22) Filed: Dec. 1, 2020

(65) Prior Publication Data

US 2022/0141921 A1    May 5, 2022

Related U.S. Application Data

(60) Provisional application No. 63/109,269, filed on Nov. 3, 2020.

(51) Int. Cl.

| | | |
|---|---|---|
| *H04W 92/20* | (2009.01) | |
| *H04W 88/16* | (2009.01) | |
| *H04W 48/18* | (2009.01) | |
| *H04W 76/12* | (2018.01) | |
| *H04W 84/04* | (2009.01) | |
| *H04W 88/08* | (2009.01) | |

(52) U.S. Cl.
CPC .......... *H04W 88/16* (2013.01); *H04W 48/18* (2013.01); *H04W 76/12* (2018.02); *H04W 84/045* (2013.01); *H04W 88/08* (2013.01); *H04W 92/20* (2013.01)

(58) Field of Classification Search
CPC ..... H04W 88/16; H04W 48/18; H04W 76/12; H04W 84/045; H04W 88/08; H04W 92/20
USPC .................................................. 370/328, 370
See application file for complete search history.

(56) References Cited

U.S. PATENT DOCUMENTS

| | | | | |
|---|---|---|---|---|
| 2013/0097418 | A1* | 4/2013 | Bhatt | H04W 76/12 713/160 |
| 2013/0229986 | A1* | 9/2013 | Rasanen | H04M 15/8038 370/328 |
| 2022/0110155 | A1* | 4/2022 | Chou | H04W 74/085 |

* cited by examiner

*Primary Examiner* — Inder P Mehra
(74) *Attorney, Agent, or Firm* — Jaquez Land Greenhaus & McFarland LLP; Bruce W. Greenhaus, Esq.

(57) ABSTRACT

Systems and methods for a communications system architecture having a base station/access points, a multiple operator core Gateway/X2 Gateway, a plurality of Mobile Network Operator core networks and an enterprise core network are present. A first secure tunnel is provided for communicating user-plane traffic between the base station/access points and the multiple operator core Gateway/X2 Gateway. A second secure tunnel is provided for communicating control-plane traffic between the base station/access points and the enterprise core network. Additional secure tunnels are provided for communications between the multiple operator core Gateway/X2 Gateway and each Mobile Network Operator core.

14 Claims, 12 Drawing Sheets

METHOD AND APPARATUS FOR MOCN GW AND X2 GW REALIZATIONS FOR ENTERPRISE DEPLOYMENTS

CROSS-REFERENCE TO RELATED APPLICATION

The present application claims priority to U.S. Provisional Application No. 63/109,269 filed, Nov. 3, 2020, entitled "Method and Apparatus for MOCN GW and X2 Realizations for Enterprise Deployments", which is herein incorporated by reference in its entirety.

BACKGROUND

(1) Technical Field

The disclosed method and apparatus generally relate to establishing a communication link to a communications network. In particular, the disclosed method and apparatus relate to assisting user equipment (UE) to communicate with a local enterprise network, one or more third party networks, and a Mobile Network Operator (MNO) network.

(2) Background

FIG. 1 shows a basic configuration for a communication network 100, such as a "4G LTE" (fourth generation Long-Term Evolution) or "5G NR" (fifth generation New Radio) network, in which user equipment (UE) 101 communicates with a base station/access point (BS/AP) 103. The term UE refers to a wide array of devices having wireless connectivity, such as a cellular mobile phone, Internet of Things (IoT) device, virtual reality googles, robotic device, autonomous driving machine, smart barcode scanner, and communications equipment. Communications equipment includes desktop computers, laptop computers, tablets and other types of personal communications devices.

Throughout this disclosure, the term BS/AP is used broadly to include at least an eNB (Evolved Node B or E-UTRAN Node B) of a 4G network or gNB (5G node B) of an LTE/5G network, a cellular base station (BS), a Citizens Broadband Radio Service Device (CBSD), a WiFi access node, a Local Area Network (LAN) access point, a Wide Area Network (WAN) access point, etc. and should also be understood to include other network receiving hubs that provide wireless access to a network via a plurality of wireless transceivers.

In some cases, a UE 101 uses a BS/AP 103 to gain access to a plurality of networks that in turn provide access of other devices and services. These networks may consist of public and enterprise networks. The industry standards that define 5G technology support both public networks and enterprise networks. Public networks include networks that are open to any subscriber, such as cellular networks. Enterprise networks are typically networks for which access is restricted to members of a particular organization or "enterprise", thus the name. Network administrators typically determine whether a particular UE has access to the network. In many such cases, access is controlled by allowing only UEs to whom proper credentials have been provided by the network administrator. Often, the credentials comprise a digital code that is encrypted on a Subscriber Identification Module (SIM) card. The BS/AP 103 is coupled to a core network (hereafter "core") 105 that manages traffic through the BS/AP 103 and connectivity (i.e., access) to resources, such as the internet 107.

FIG. 2 is an illustration of a larger network 204, such as a 5G cellular network operated by an MNO, sometimes referred to as a wireless service provider. Within the geographic operating area of the MNO network 204, an enterprise network 208 may be established by a private network operator, such as an enterprise network operator (ENO). BS/APs 103a of the MNO network 204 may service a plurality of UEs 101. Each may be present within a coverage area of the MNO network 204 that operates on a first frequency f1. In some cases, the enterprise network 208 is located within the geographic footprint of the MNO network 204. In such cases, one or more enterprise network BS/APs 103 may provide connectivity over a second frequency, f2 to allow UEs 101 within the geographic footprint to access the enterprise network 208.

In addition to MNOs and ENOs, Mobile Virtual Network Operators (MVNOs) provide a "virtual" network that uses both the BS/APs and the network infrastructure operated by MNOs to provide access for an MVNO subscriber UE (hereafter, simply referred to as a "MVNO UE") to services. Still further, there are services that use an MNO BS/AP, but that route packets through that MNO BS/AP to their own network Evolved Packet Core (EPC). For the purposes of this disclosure, these networks are referred to as "Third-Party" (TP) networks. Throughout this disclosure, communications are discussed in which "packets" are "routed", "transmitted" and "received". However, packets are merely one example of communications and embodiments are not limited to packets, as communications may take other forms as well.

FIG. 3 shows a configuration in which a UE 302 within the coverage area of an MNO network can communicate with the MNO network and a TP network through an MNO BS/AP (i.e., eNB). Some TP networks 305 provide a communication service that allows their subscribers to establish a communication link to the TP network's infrastructure (e.g., an enterprise core network 306, such as an enterprise EPC) through the physical radio infrastructure of another network (e.g., the MNO 303). An architecture in which more than one core network (hereafter "core") 306, 307 can be accessed through the same BS/AP is commonly referred to as a Multi-Operator Core (MOCN). In some embodiments, the BS/AP is an eNB (Evolved Node B or alternatively E-UTRAN Node B) 304. In such cases, a gateway, such as a MOCN gateway 309, resides between the eNB 304 and one or more cores, each of which can be accessed by a UE 302 through the eNB 304. The MOCN gateway directs packets that flow from the UE 302 through the eNB 304 to the appropriate core 306. While only one such core 306 is shown, it should be understood that there may be other such cores as well. A TP network subscriber UE (hereafter, simply referred to as a "TP UE") 302 within the coverage area of an MNO network 303 may be connected to the MNO eNB 304. The MNO eNB 304 is part of the MNO network 303; but is connected to the TP network 305 through the MOCN gateway 309. Accordingly, the MNO eNB 304 can be used to connect the UE 302 to the TP network's EPC 306.

FIG. 4 is a simplified block diagram of the components of an EPC, such as the MNO EPC 307 shown in FIG. 3. The EPC 307 comprises an MME (Mobility Management Entity) 402, SGW (Serving Gateway) 404, at least one PGW (Packet Gateway) 406, HSS (Home Subscriber Server) 408, ePDG (evolved Packet Data Gateway) 410, etc. The SGW routes UE 302 data packets to a Packet Data Network (PDN) 412. Accordingly, the MNO EPC 307 can establish a connection to an outside PDN 412 and thus provide connectivity to the internet 308 or to other external services. That is, while the TP network 305 uses the MNO's eNB 304, the TP network 305 provides its own EPC 306 to allow the TP network 305 to control data flows through the MNO's eNB 304.

In most network architectures, secure communications between the BS/AP and each of the networks is important. For architectures in which there are several possible sources and destinations for communications to and from the BS/AP, there is a need for a method and apparatus to manage the information flows.

SUMMARY

Various embodiments of a communications system architecture are disclosed in which a user equipment (UE) can gain access to various networks through one more gateways and secure tunnels.

In a first embodiment of the disclosed communications system architecture, base station/access points (BS/APs), a multiple operator core Gateway/X2 Gateway (MGXG), a plurality of Mobile Network Operator (MNO) core networks (hereafter "MNO cores") and an enterprise core network (hereafter "E-core") are present. A first secure tunnel is provided for communicating user-plane traffic between the BS/APs and the MGXG. A second secure tunnel is provided for communicating control-plane traffic between the BS/APs and the E-core. Additional secure tunnels are provided for communications between the MGXG and each MNO core.

A second architecture is disclosed in which a third party core network (hereafter "TP core") is accessible through the MGXG. Packets to be locally offloaded are detected at the BS/APs and communicated over an MNO secure tunnel between the B S/AP and the MGXG. The MGXG routes those offloaded packets to the TP core.

In a third disclosed architecture, a MGXG has an MOCN Gateway Module (MGM) and an integrated X2 Gateway Module (XGM). The XGM performs X2 mobility functional for both the MNO network traffic and for the enterprise network traffic.

A fourth architecture has at least one TP core with which the MGXG can communicate Local Traffic Offload (LTO) traffic. The MGM in the MGXG determines whether packets are LTO traffic and sends them to a portal of the MGXG that accesses a secure tunnel to the TP core.

A fifth architecture is disclosed in which X2 mobility functionality for an enterprise network is provided by an XGM within an E-core with an Integrated X2 GW (ECXG). In this architecture, a separate secure tunnel is not required for enterprise network X2 mobility traffic. Rather, such traffic is communicated through the same secure tunnel between the BS/AP and the E-core that is used to communicate control-plane traffic and user-plane traffic between the BS/AP and the E-core. Since the X2 mobility functionality is performed by the XGM within the E-core, no additional secure tunnel is necessary to perform all desired X2 mobility functions.

In a sixth architecture, a discrete Unified X2 Gateway (UXG) is provided independent of the cores to perform X2 mobility functions, thus simplifying the MOCN GW and E-core (which, accordingly, do not have to perform such X2 mobility functions). The UXG performs the X2 mobility functions for both the MNO network and the enterprise network.

In a seventh architecture, an MNO X2 GW (MXG) is provided for mobility functionality related to the MNO network traffic. Mobility functionality related to the enterprise network traffic is managed by an X2 GW integrated into an ECXG.

In an eighth architecture, a UXG manages and coordinates X2 functionality for both an MNO network and an enterprise network and each BS/AP has an MNO Secure Tunnel (MST) for MNO traffic and an Enterprise Secure Tunnel (EST) for enterprise traffic to and from the BS/AP.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 5:
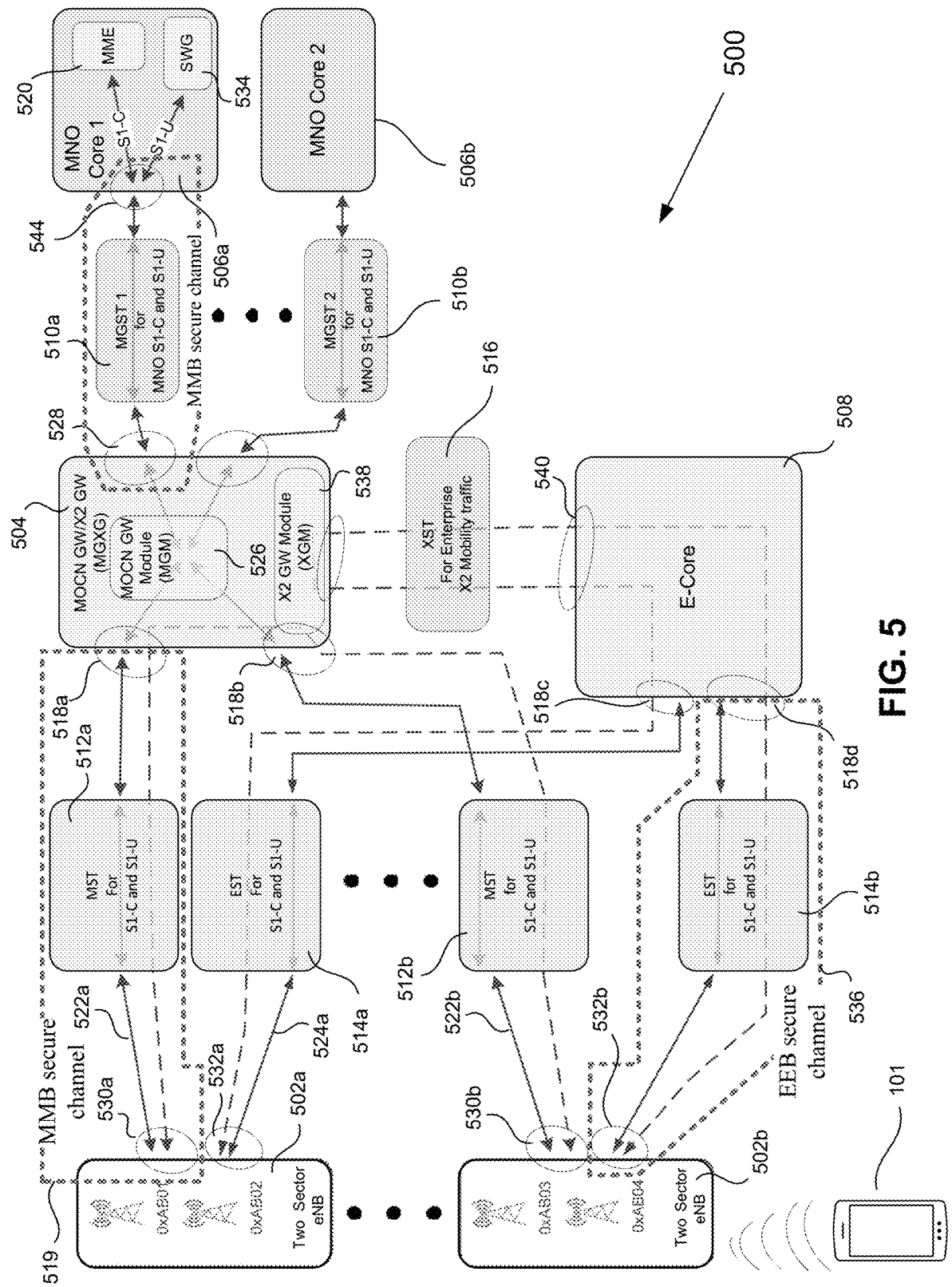
FIG. 5 is an illustration of an architecture comprising base station/access points (BS/APs), a multiple operator core Gateway/X2 Gateway (MGXG), a plurality of Mobile Network Operator (MNO) cores and an enterprise core.

FIG. 5 is an illustration of an architecture 500 in accordance with one embodiment of the disclosed method and apparatus. The architecture 500 comprises several components, including base station/access points (BS/APs) 502a, 502b, a multiple operator core (MOCN) Gateway (GW)/X2 GW 504, one or more Mobile Network Operator (MNO) cores 506 (hereafter referred to simply as the "MNO core") and an enterprise core 508 (hereafter referred to simply as the "E-core").

Secure tunnels 510, 512, 514, 516 allow secure communication to be established between components 502, 504, 506, 508 of the architecture 500, as will be discussed in detail below. An MNO (also known as a wireless service provider, wireless carrier, cellular company, or mobile network carrier) is a provider of wireless communications services that owns or controls all the elements necessary to sell and deliver services to an end user including radio spectrum allocation, wireless network infrastructure (including an MNO core), back haul infrastructure, billing, customer care, provisioning computer systems (which may reside in the MNO core) and marketing and repair organizations.

It should be noted that throughout this disclosure, reference indicators used in the figures may include numeric characters followed by an alphabetic character, such as 502a in which the numeric characters "502" are followed by the alphabetic character "a". Reference indicators having the same numeric characters refer to features of the figures that are similar in their function. For example, the MNO cores 506a, 506b perform similar functions, however each MNO core 506 may be associated with a different MNO. Furthermore, similar features may be referenced collectively using only the numeric characters of the reference indicator. For example, in the present disclosure, "MNO core 506" refers to the MNO cores 506a, 506b and any other such similar MNO cores.

It should be further noted that ellipses are shown between MOCN GW Secure Tunnels (MGSTs) 510 to indicate that additional MNO cores 506 similar to the two shown, as well as additional associated secure tunnels 510, may be present in the architecture 500. Each of the secure tunnels will be discussed in greater detail below. Similarly, ellipses are shown between BS/APs 502 and secure tunnels 512, 514 to indicate that additional BS/APs 502 and secure tunnels 512, 514 may be present in the architecture 500. In some embodiments, the BS/APs 502 are multiple sector eNodeBs, such as are commonly used in 4G and 5G networks.

As noted previously, throughout this disclosure, the term BS/AP is used broadly to refer to one or more of the following: an eNB (Evolved Node B or E-UTRAN Node B) of a 4G network or gNB (5G node B) of an LTE/5G network; a cellular base station (BS); a Citizens Broadband Radio Service Device (CBSD); a WiFi access node a Local Area Network (LAN) access point; a Wide Area Network (WAN) access point; etc. This term may also be used to refer to any other type of network receiving hub that provides wireless access by a plurality of wireless transceivers to a network.

User equipment (UE) 101, communicates wirelessly through the BS/AP 502 to one or more of the cores 506, 508.

Also noted above, the term UE is used to refer to a wide array of devices having wireless connectivity, such as a cellular mobile phone, Internet of Things (IoT) device, virtual reality googles, robotic device, autonomous driving machine, smart barcode scanner, and communications equipment. Communications equipment includes desktop computers, laptop computers, tablets and other types of personal communications devices.

When a UE 101 enters the coverage area of a BS/AP 502, radio contact is established between the UE 101 and the BS/AP 502. Typically, a relatively rigorous authentication process occurs in which a mobility management entity (MME) 520 within a core 506, 508 ensures that the UE 101 has the required "credentials" to access the resources available through the core 506, 508. The details of this process are well known and not relevant to the architecture 500 disclosed.

However, what is relevant is that a secure interface between the BS/AP 502 and the cores 506, 508 allows a UE 101 to establish a secure communication link to the core 506, 508 through which the UE can take advantage of the resources that the network has to offer (i.e., communicate through a SWG 534 and associated Packet Gateway (PGW) not shown for simplicity, but maintained within the cores 506, 508). The interface between the BS/AP 502 and the core 506, 508 is commonly known as an S1 interface.

As defined by industry standards, the S1 interface has a user-plane and a control-plane component. The user-plane is commonly referred to as S1-U and carries all user data as well as application layer signaling (such as session initiation protocol (SIP) or real-time transport protocol (RTP) and real-time transport control protocol (RTCP) packets). The control-plane is commonly referred to as S1-C and handles all messages and procedures related to the radio interface supported features. An example of the control-plane messages is the control messages for handover management or bearer establishment. A "bearer" is a communication channel that carries call content (as opposed to carrying signaling). In the common-channel signaling scheme for telecommunications, signaling is sent out-of-band, while all other traffic rides bearer channels.

Different "tunneling protocols" are used across different interfaces. A 3GPP-specific tunneling protocol called "GPRS tunneling protocol (GTP)" is used over the S1 interface for both user-plane and control-plane traffic in embodiments conforming to the 3GPP standards. 3GPP is the 3rd Generation Partnership Project, an umbrella term for a number of standards organizations that develop protocols for mobile telecommunications.

Figure 1:
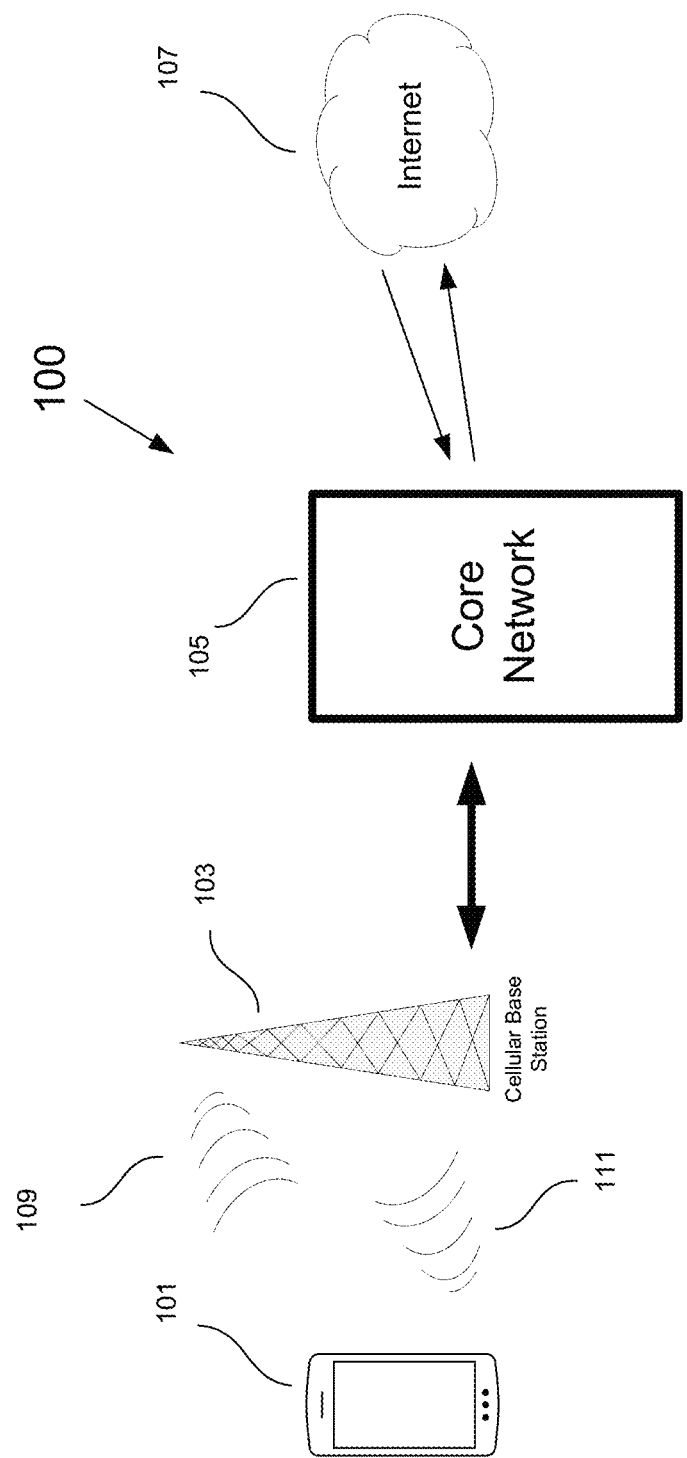
FIG. 1 shows a basic configuration for a communication network, such as a "4G LTE" (fourth generation Long-Term Evolution) or "5G NR" (fifth generation New Radio) network, in which user equipment (UE) communicates with a base station/access point (BS/AP).
Figure 2:
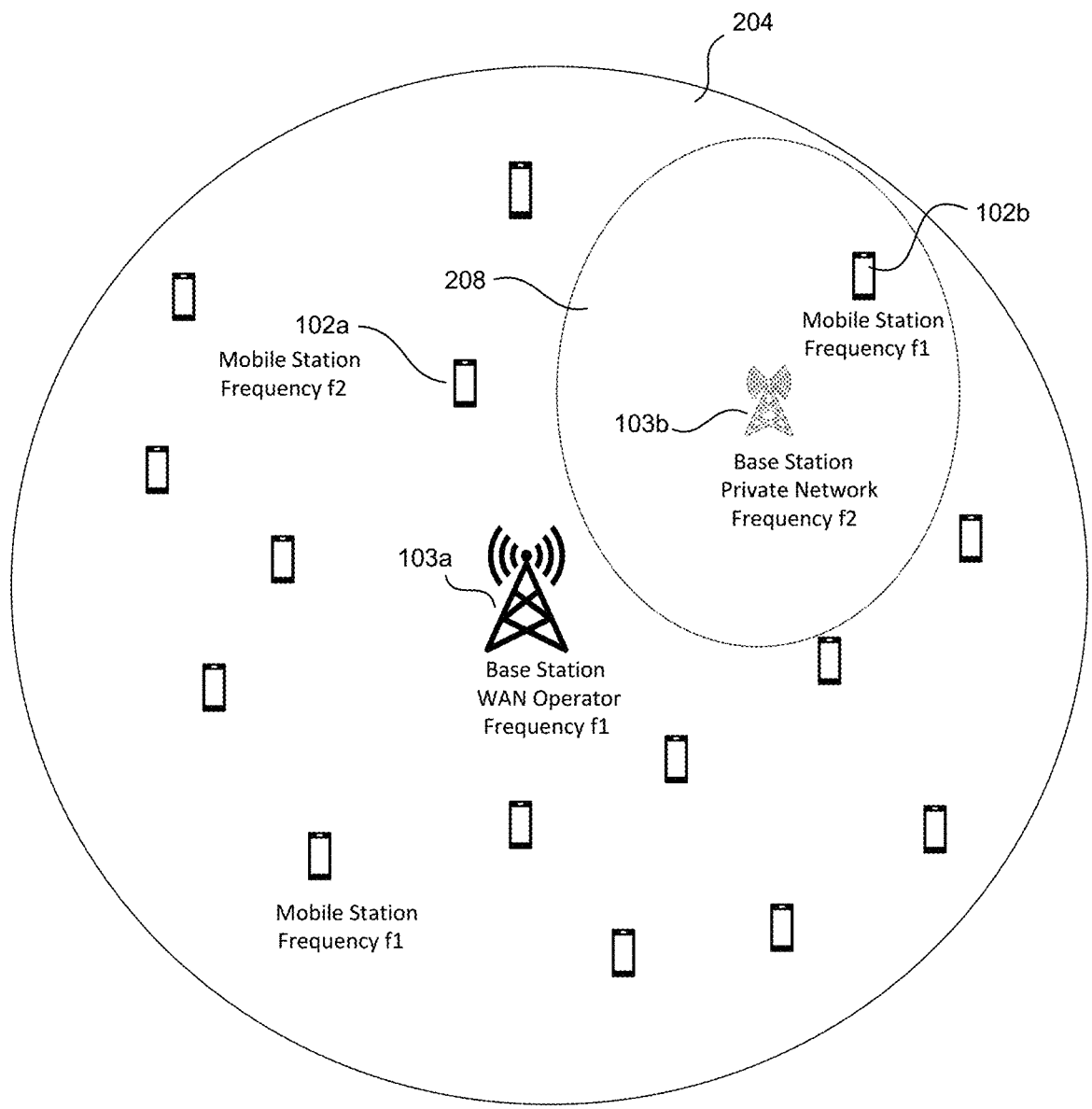
FIG. 2 is an illustration of a larger network, such as a 5G cellular network operated by a Mobile Network Operator (MNO), sometimes referred to as a wireless service provider.
Figure 3:
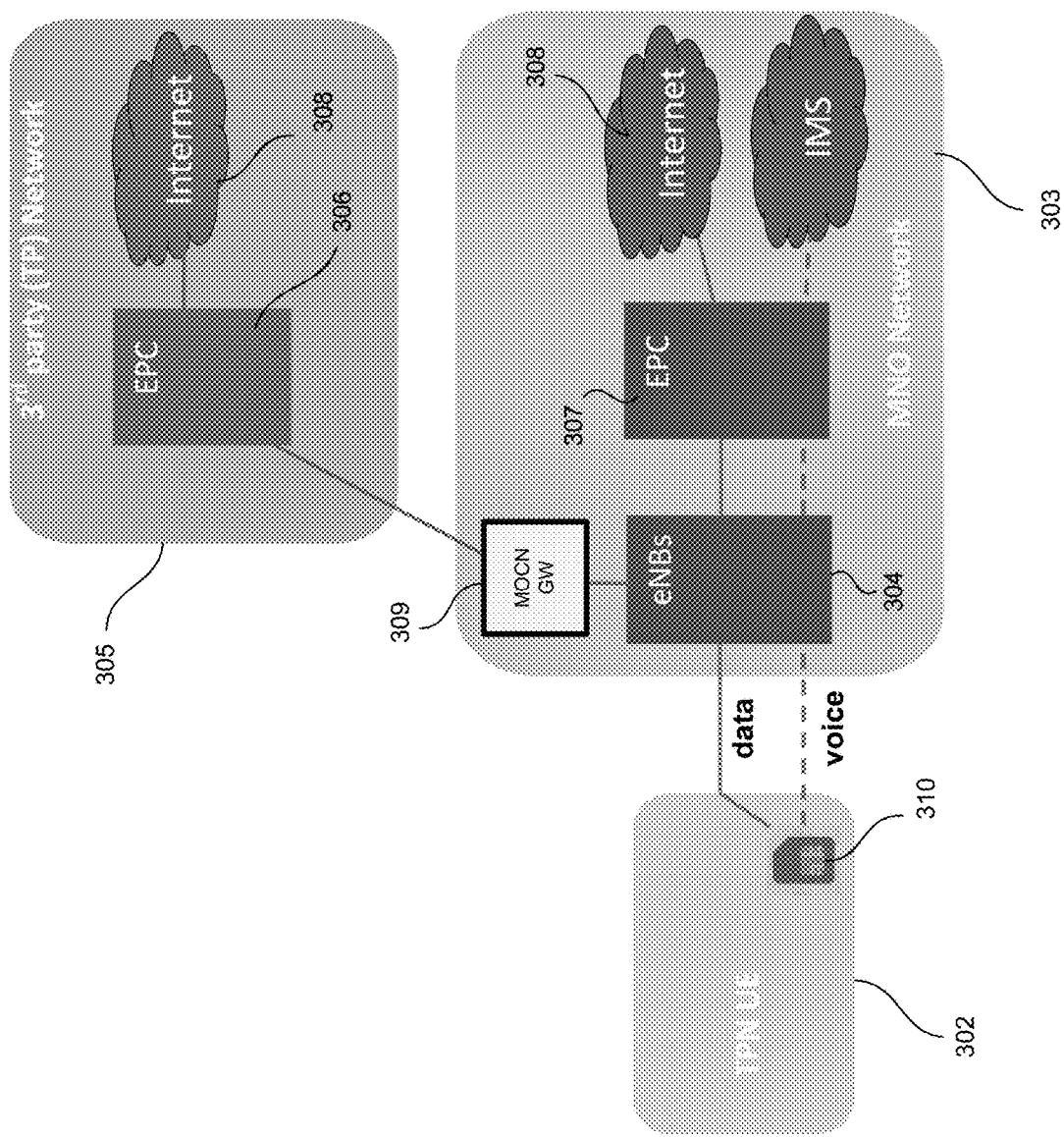
FIG. 3 shows a configuration in which a UE within the coverage area of an MNO network can communicate with the MNO network and a TP network through an MNO BS/AP.
Figure 4:
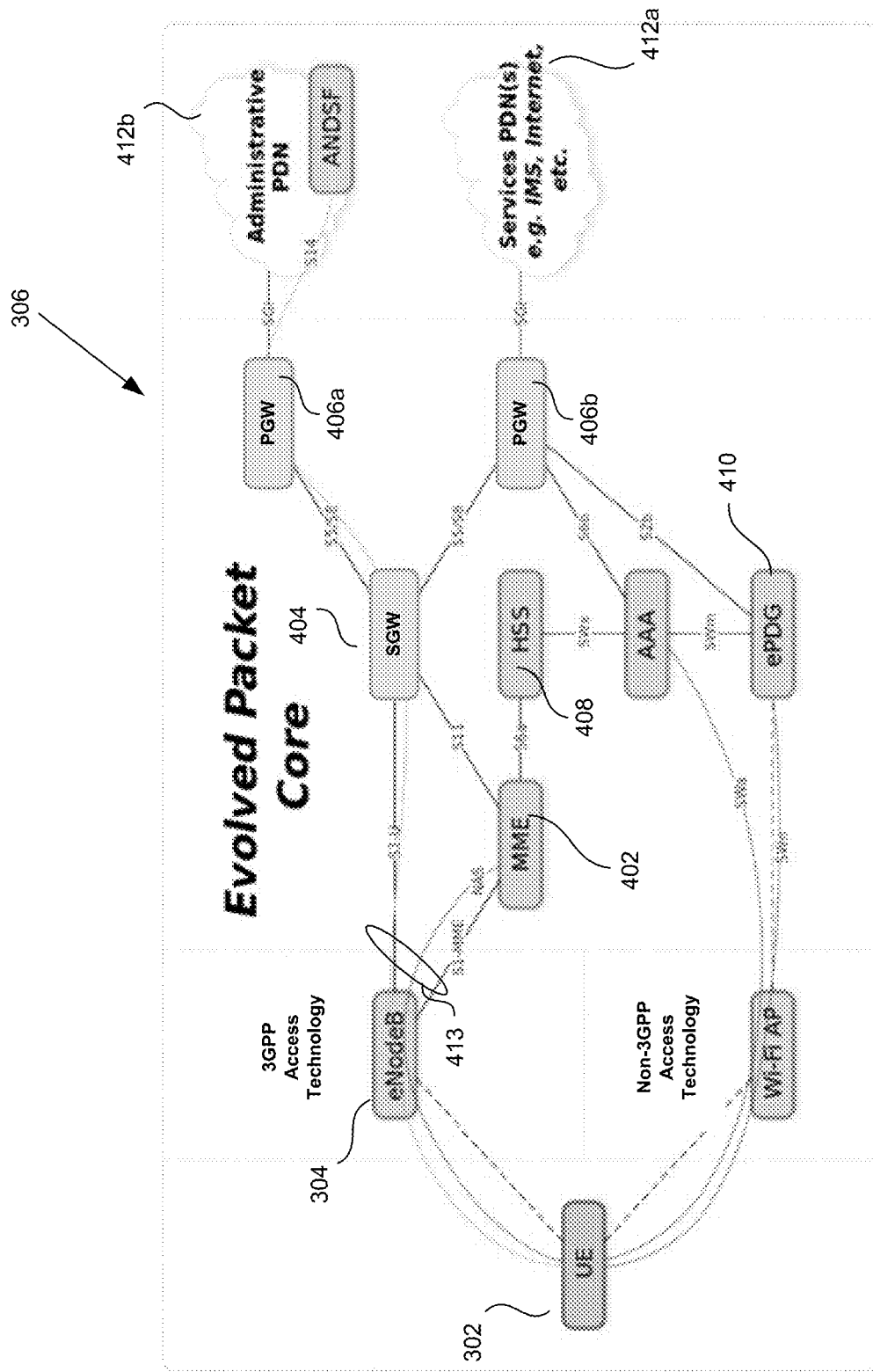
FIG. 4 is a simplified block diagram of the components of an EPC, such as the TP EPC shown in FIG. 3.

To establish a bearer with a particular network, communication with the core 506, 508 has to be directed to the appropriate network. A UE in accordance with one embodiment of the disclosed method and apparatus has at least one System Identification Module (SIM) card 310 (see FIG. 3) that carries credentials that allow an UE 302 to be authenticated by at least one of the networks (i.e., by an MME in one of the cores 506, 508, such as the MME 520 shown in the MNO core 506a). In some embodiments of the disclosed method and apparatus, the MOCN GW/X2 GW (MGXG) 504 has several Base Station (BS) Portals 518, each configured to receive communications from, and transmit communications to, one BS/AP 502 through one MNO Secure Tunnel (MST) 512. In some embodiments, each of the MSTs 512 has a one-to-one correspondence with a unique MNO Portal 530 of one of the BS/APs 502. Accordingly, the BS/AP 502*a* (and more particularly, an MNO Portal of the BS/AP 502), the MST 512*a* and the BS Portal 518 define a "Secure Channel". In this case, they define a "MMB Secure Channel" 519, MMB being an acronym for M(GXG)M(ST)M(S/AP), i.e., the three components of the MMB Secure Channel 519.

In the architecture 500, each MMB Secure Channel 519 provides a secure communication path for control-plane and user-plane traffic between one MNO Portal 530 of one of the BS/APs 502 and the MGXG 504. In addition, the BS/AP 502 has an Enterprise Portal 532 coupled to a "enterprise secure tunnel" (EST) 514. The BS/AP 502 has the ability to determine whether traffic received from a UE 101 is intended for the MNO core 506 or the E-network 508. The BS/AP 502 routes MNO traffic 522 (i.e., traffic that is intended for one of the MNO cores 506) through the MST 512. The MST 512 provides secure communications between the BS/AP 502 and the MGXG 504. Note that red arrows indicate MNO traffic 522, including both uplink traffic from the UE 101 and downlink traffic to the UE 101. In addition, enterprise network traffic 524 (traffic between the UE 101 and the core of an enterprise network) is color coded blue and is routed to a "enterprise secure tunnel" EST 514*a*. The EST 514*a* provides a secure communication path between the BS/AP 502*a* and the E-core 508. Furthermore, dashed red arrows signify the path for MNO X2 traffic, which is discussed further below, while dashed blue arrows signify the path for enterprise network X2 traffic.

The MGXG 504 has a MOCN GW Module (MGM) 526 and an X2 GW Module (XGM) 538. For uplink traffic, the MGM 526 receives MNO communications (i.e., traffic intended for the MNO core 506) from a transmitting BS/AP 502. The MNO core intended communications are sent from the BS/AP 502 through an MST 512 dedicated to communicating secure communications from the BS/AP 502 to the MGM 526 through the BS Portal 518 of the MGXG 504. The MNO core intended communications are coupled from the BS Portal 518 to the MGM 526. The MGM 526 routes such received MNO core intended communications to an intended MNO core 506 through an MMM (MNO core-MGST-MGXG) Secure Channel 543. The MMM Secure Channel 543 comprises an MNO Portal 528, an MGST 510 an associated MOCN GW Portal 544 of a MNO core 506. There is a one-to-one correspondence between the three elements of the MMM Secure Channel, such that the MNO Portal 528 is associated with only one MGST 510 and only one MOCN GW Portal 544. Similarly, the MGST 510 is associated with only one MNO Portal 528 and only one MOCN GW Portal 544. Likewise, the MOCN GW Portal 544 is associated with only one MNO Portal 528 and only one MGST 510. Communications are sent based on information contained within the packets, as determined by the MGM 526. The MMM Secure Channel 543 provides a secure communication link between the MGXG 504 and the MNO core 506.

It should be noted that in the architecture 500, both user-plane and control-plane traffic traverse the same route from the BS/AP 502 to the MNO core 506. Distinctions between user-plane and control-plane communications at the MNO core 506 cause the user control traffic to be directed to the MME 520 and the user-plane traffic to a serving gateway (SGW) 534 within the MNO core 506. It should also be noted that multiple such MNO cores 506 can be coupled to the MGXG 504 through different MNO Portals 528, each coupled to a unique and secure MGST 510. The MGM 526 determines which MNO core 506 the traffic is intended for and routes the traffic to the appropriate MNO Portal 528.

Having MNO Portals 530 that are distinct from the Enterprise Portals 532 at the BS/AP 502 allows separate secure communication to the MNO core 506 and to the E-core 508 through different secure tunnels. It should be noted that in the architecture 500 the BS/APs 502 can be owned by an MNO, by the enterprise network or jointly owned by both. In all cases, the BS/AP 502 has access to both the E-core 508 and the MNO core 506.

Downlink traffic traverses a similar path, but in reverse. That is, downlink MNO traffic originates at the MNO core 506. The MNO core 506 is places the traffic onto the MGST 510 to be communicated securely to the MNO Portal 528 of the MGXG 504. The MNO Portal 528 provides the traffic to the MGM 526. The MGM 526 determines to which UE 101 (and accordingly with the assistance of the HSS, to which BS/AP 502) the traffic is intended to be routed. The MGM 526 routes the traffic to the appropriate BS Portal 518 of the MGXG 504. The traffic then flows through the MST 512 associated with that BS Portal 518 and arrives securely at the BS/AP 502 through the dedicated MNO Portal 530 of the BS/AP 502.

When a UE 101 is attempting to access resources within an enterprise network through a BS/AP 502, the BS/AP 502 detects that the intent of the UE 101 is to communicate with the E-core 508. Both user-plane and the control-plane traffic from the UE 101 are routed by the BS/AP 502 through the Enterprise Portal 532 of the BS/AP 502 to the EST 514. The EST 514 provides a secure communication channel from the BS/AP 502 to the E-core 508. A BS Portal 518 in the E-core 508 is coupled to the EST 514 to receive the secure from the BS/AP 502. An EEB Secure Channel 536 is defined by the combination of the E-core BS Portal 518, associated EST 514 and associated BS/AP Enterprise Portal 532. Accordingly, EEB is an acronym for the three components (E-core/EST/BS/AP) that comprise the EEB Secure Channel 536. In some embodiments, the two portals 518, 532 and the EST 514 have an exclusive one to one correspondence, such that for each Enterprise Portal 532 in the BS/AP 502, there is one and only one associated EST 514 and one and only one associated BS Portal 518 in the E-core 508. Once user-plane traffic and control-plane traffic are received by the E-core 508 through the BS Portal 518, the user-plane traffic is routed to the SWG (not shown) within the E-core 508 and control-plane traffic is routed to the MME (not shown) within the E-core 508.

Similarly, downlink traffic originating at the E-core 508 intended for a particular UE 101 is routed through the EEB Secure Channel 536 from the E-core 508 to the particular BS/AP 502 to which the UE 101 is attached through the BS Portal 518 of the E-core 508. The BS Portal 518 of the MGXG 504 is coupled to the EST 514 which securely routes the traffic to the BS/AP Enterprise Portal 532 of the BS/AP 502. The BS/AP 502 then transmits the traffic over the air to the UE 101 for which the traffic is intended.

In addition to control plan and user plan traffic that flows between the BS/AP 502 and the cores network 506, 508, X2 mobility traffic flows between the BS/APs 502 and the XGM 538 within the MGXG 504. X2 mobility traffic is used to communicate control messages related to managing which BS/AP 502 a UE 101 will use when communicating with an MNO network and/or an enterprise network. In the architecture 500 shown in FIG. 5, an integrated XGM 538 within the MGXG 504 manages which BS/AP 502 a UE 101 will use to communicate with for both the MNO core 506 and the E-core 508.

In the architecture 500, X2 mobility traffic related to the MNO network originating or terminating at a BS/AP 502 flows through the MMB Secure channel 519. The BS Portal 518 in the MGXG 504 is coupled to both the MGM 526 and the XGM 538. In the case of X2 mobility traffic, the traffic is coupled to the XGM 538. Similar MMB Secure Channels between the MGXG 504 and other BS/APs 502 allow the XGM 538 to coordinate which BS/AP 502 traffic will flow through for each particular UE 101 when communicating with the various networks (i.e., cores network 506, 508).

For enterprise network X2 mobility traffic originating and terminating in the BS/AP 502, the traffic flows through the EEB Secure Channel 536 between the BS/AP 502 and the E-Core 508. Once received through the BS Portal 518, the E-core 408 routes the X2 traffic to an X2 Portal 540 of the E-Core 508. The X2 Portal 540 is coupled to an X2 Secure Tunnel (XST) 516. The XST 516 allows secure communications to pass between the X2 Portal 540 of the E-Core and the XGM 538 through an X2 Portal 542 in the MGXG 504. Similar EEB Secure Channels to other BS/APs 502 allow X2 traffic to flow to the E-Core 508, and through to the XGM 538 to allow the XGM 538 to coordinate between the BS/AP 502 and the cores network 506, 508 to determine through which BS/AP 502 each particular UE 101 communicates with the various networks (i.e., cores network 506, 508). Since there is no direct secure tunnel for enterprise related X2 traffic between the BS/APs 502 and the XGM 538 within the MGXG 504, the combination of the EEB Secure Channel 536 and the XST enable X2 traffic to be securely communicated between the BS/APs 502 and the XGM 538.

Figure 6:
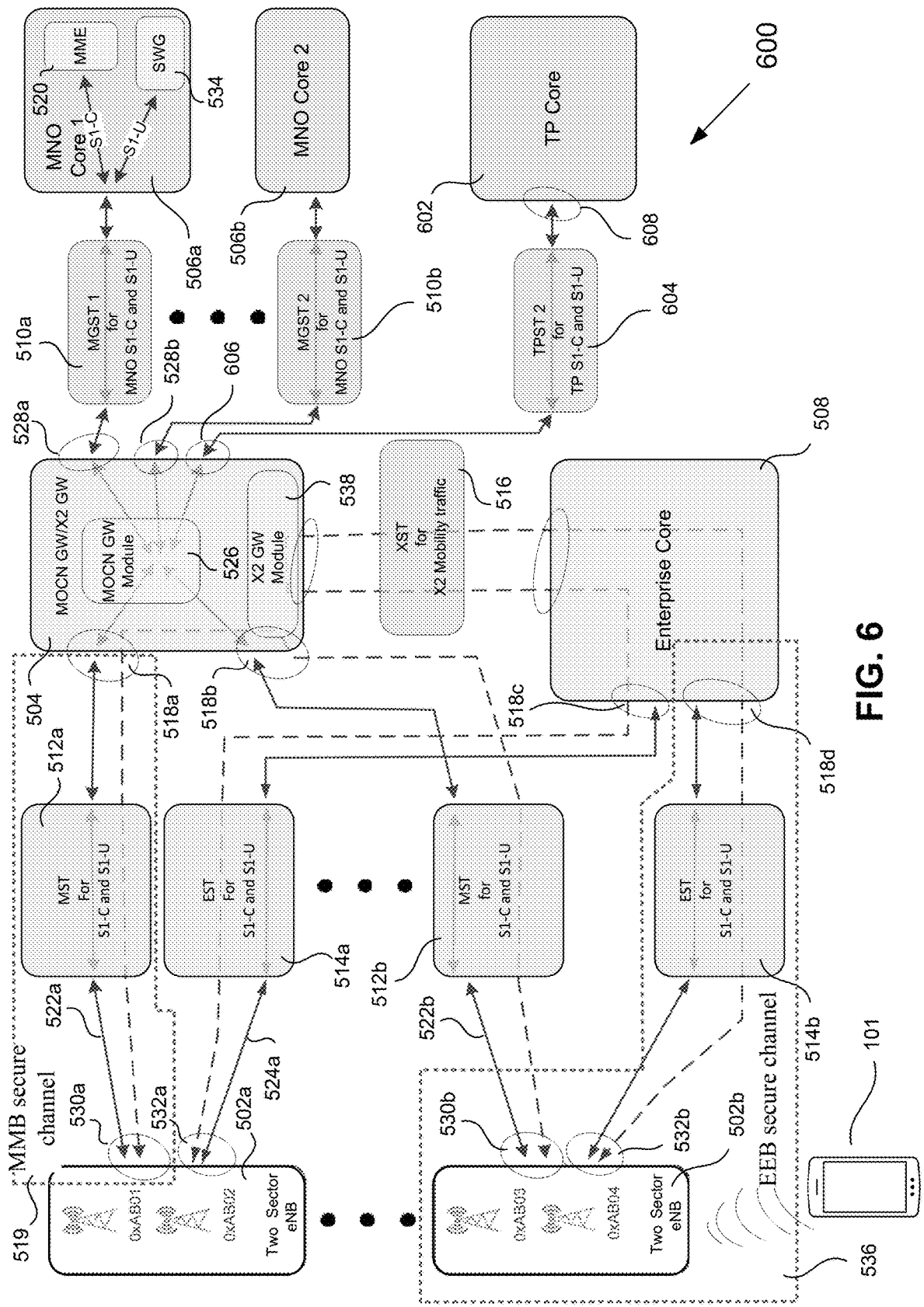
FIG. 6 shows an architecture in which a third party core (TP core) is accessible through the MGXG.

FIG. 6 shows a configuration 600 in which a third party core (TP core) 602 is accessible through the MGXG 504. In this configuration, in addition to the BS/AP 502 having the ability to distinguish between traffic intended for the MNO core 506 and traffic intended for the E-core 508, the BS/AP 502 has the ability to detect attempts by a UE 101 to access services provided by a third party, such as Google Fi, that use the network infrastructure of an MNO and possibly of the enterprise network to gain access a TP core. In such cases, the BS/AP 502 detects that the UE is a third party subscriber. Third party intended communications (TIC) that originate at a BS/AP 502 (i.e., communications the sending UE 101 intended to send to the TP core 602) are sent from the BS/AP 502 through the MST 512 to the BS Portal 518 of the MGXG 504 that is associated with the transmitting BS/AP 502. Upon receipt at the MGXG 504, the TIC is provided to the MGM 526. The MGM 526 provides the TIC to a third party (TP) Portal 606. The TP Portal 606 is associated with a unique third party secure tunnel (TPST) 604 and corresponding MGXG Portal 608 in the TP core 602. Accordingly, the TIC is routed from the MGXG 504 to the TP core 602 through the TPST 604 to allow the TIC traffic to gain access to the TP core 602. In some cases in which a third party subscriber is granted access to services provided by the enterprise network or the MNO network, traffic originating at a third party UE may be selectively routed by the BS/AP 502 to the E-core 508 to allow the UE to gain access to resources provided through the E-core 508 or to the MNO core 506, while routing some of the remaining packets to the TP core 602. Such splitting of packets between the third party network and the enterprise network is referred to as Local Traffic Offload (LTO).

Figure 7:
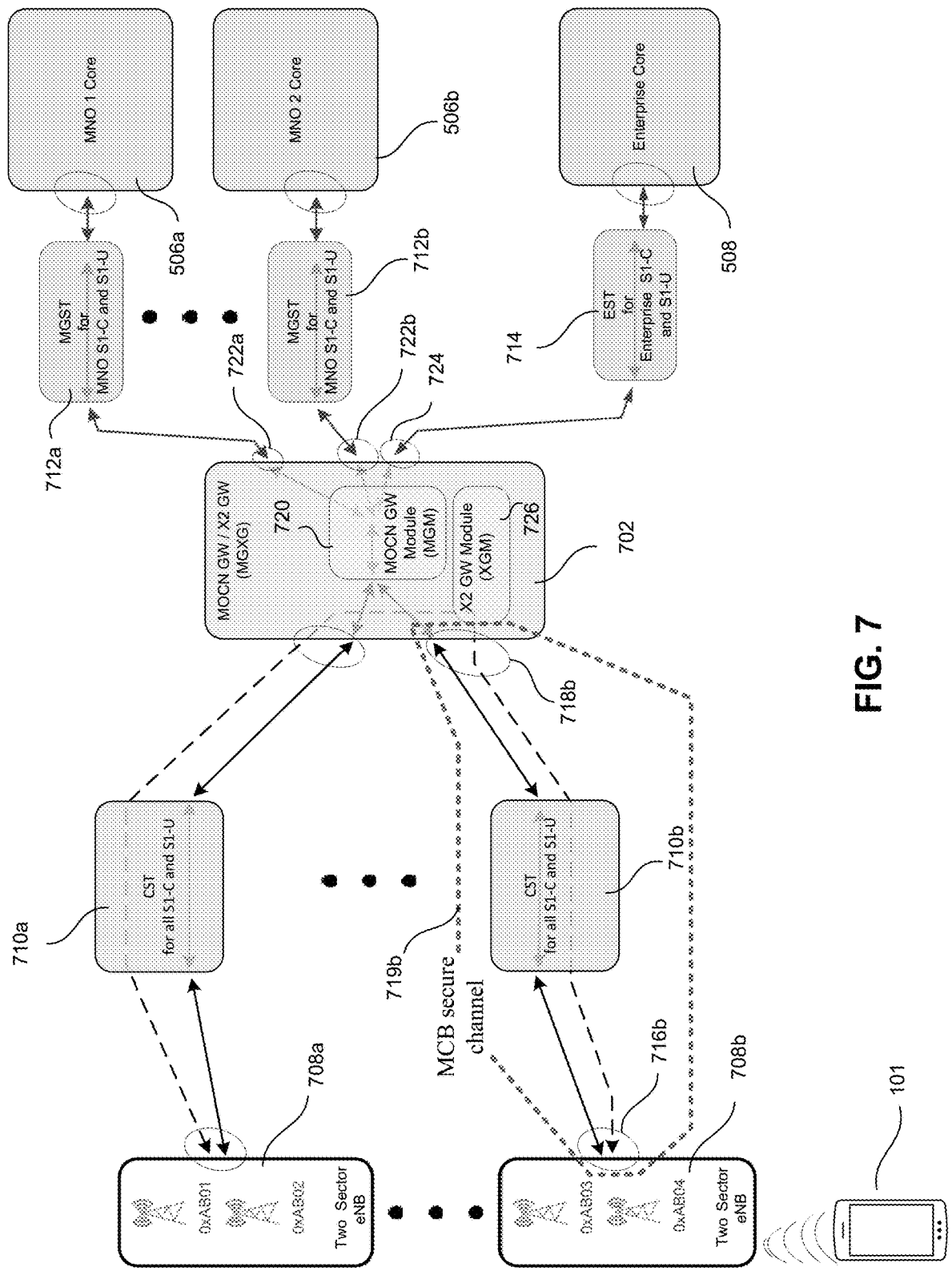
FIG. 7 shows another architecture in which a MGXG has an MOCN Gateway Module (MGM) and an integrated X2 Gateway Module (XGM).

FIG. 7 shows another architecture 700 in which a MGXG 702 has an MGM 704 and an integrated XGM 706. The MGM 704 receives all traffic from BS/APs 708 through Common Secure Tunnels (CSTs) 710, each CTS 710 being dedicated to traffic from one BS/AP 708. Accordingly, both MNO traffic and enterprise traffic flows through the CST 710 servicing the BS/AP 710 that a particular UE 101 is using to access either the MNO network, the enterprise network or both.

For traffic originating at the UE 101, the traffic is transmitted wirelessly over the air to the BS/AP 708. The BS/AP 708 routes all of the traffic received from the UE 101 to a MOCN GW Portal 716 in the BS/AP 708. The MOCN GW Portal 716 is in communication with the BS Portal 718 of the MGXG 702 via the CST 710. Each MOCN GW Portal 716 is associated with a unique CST 710 and a unique BS Portal 718 in a one-to-one relationship to form a MCB Secure Channel 719 for communications between the MGXG 702 and one of the BS/APs 502. The MGXG 702 routes user-plane and control-plane traffic received through the BS Portal 718 to an MGM 704.

The MGM 704 determines whether the traffic is intended to for the MNO core 506 or E-core 508. If it is MNO traffic, the MGM 704 further determines for which particular MNO network the traffic is intended. The MGM 704 routes the MNO traffic to an MNO Portal 722 in the MGXG 702 that provides access to a MOCN GW Secure Tunnel (MGST) 712 that allows the MNO traffic to be securely communicated from the MGXG 702 to the MNO core 506 of the intended MNO network. Once received at the MNO core 506, user-plane traffic is routed to the SGW 534 and control-plane traffic is routed to the MME 520 (see FIG. 5).

If, however, the MGM 704 determines that the traffic is intended for the enterprise network (i.e., the E-core 508), the MGM 704 routes the traffic to Enterprise Portal 724 of the MGXG 702. In some embodiments there may be more than one enterprise network to which the MGXG 702 can route traffic. In such embodiments, there is one Enterprise Portal 724 associated with each one corresponding E-core 508. The Enterprise Portal 724 provides access to the E-core 508 via an EST 714. The MGM 704 detects to which network the traffic is intended to be communicated and routes the traffic appropriately to the proper Portal 722, 724. Once the traffic is received at the intended core 506, 508, user-plane traffic is routed to the SGW 534 and control-plane traffic is routed to the MME 520.

In the architecture 700, X2 mobility traffic is routed directly from the BS/AP Portal 718 of the MGXG 702 to an integrated XGM 726 that is responsible for managing mobility for both the MNO network and the enterprise network. Accordingly, the XGM 726 can monitor the BS/AP 708 to determine and manage which is most appropriate to carry traffic to and from each particular UE 101.

Figure 8:
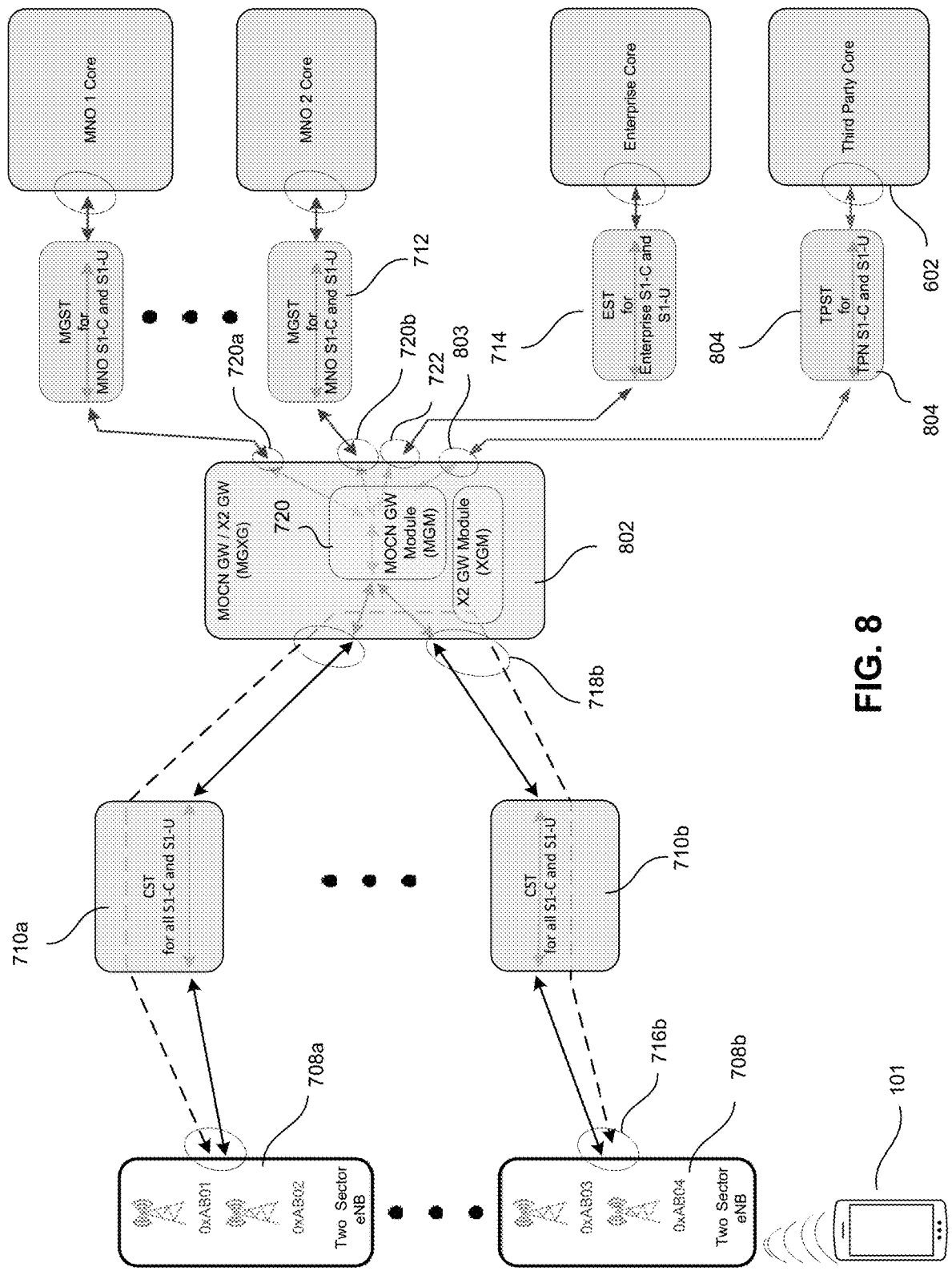
FIG. 8 illustrates an architecture similar to the architecture of FIG. 7 and further having at least one TP core.

FIG. 8 illustrates an architecture 800 similar to the architecture 700 of FIG. 7. However, the architecture 800 also includes at least one TP core 602. In the architecture 800, a UE 101 can access the TP core 602 through the MGXG 802. As noted with regard to the architecture 600 of FIG. 6, an LTO can be performed to detect portions of traffic (i.e., packets) that originate within a third party UE 101, but that are intended for the E-core 508 or for the MNO core 506. In this architecture 600, the LTO functionality can be provided in either the BS/AP 708 or the MGM 720. LTO functionality includes authenticating the UE 101 to ensure that the UE 101 has the necessary credentials to gain access to the TP network.

In addition, addresses are assigned and managed to allow packets to properly routed to and from the particular features within the TP network. That is, when a UE 101 attempts to gain access to features of the TP network, or when the TP network attempts to send packets to the UE 101, the addresses of the UE 101 and the particular features being accessed by the UE must be maintained so that proper routing of the packets can be performed by the device performing the LTO functionality. In either case, when that portion of the traffic that is intended for the third party network reaches the MGM 720, the MGM routes that portion of the traffic to the TP Portal 803 based on the addresses established when the UE 101 is authenticated by the TP core 602. The TP Portal 803 provides access to a TP Secure Tunnel (TPST) 804. The TPST 804 provides secure communications from the MGXG 802 to the TP core 602. Alternatively, when portions of the traffic are intended for either the E-core or the MNO core, the packets are routed to the appropriate Portal of the MGXG 802 to ensure that they arrive securely at the appropriate core 506, 508.

Figure 9:
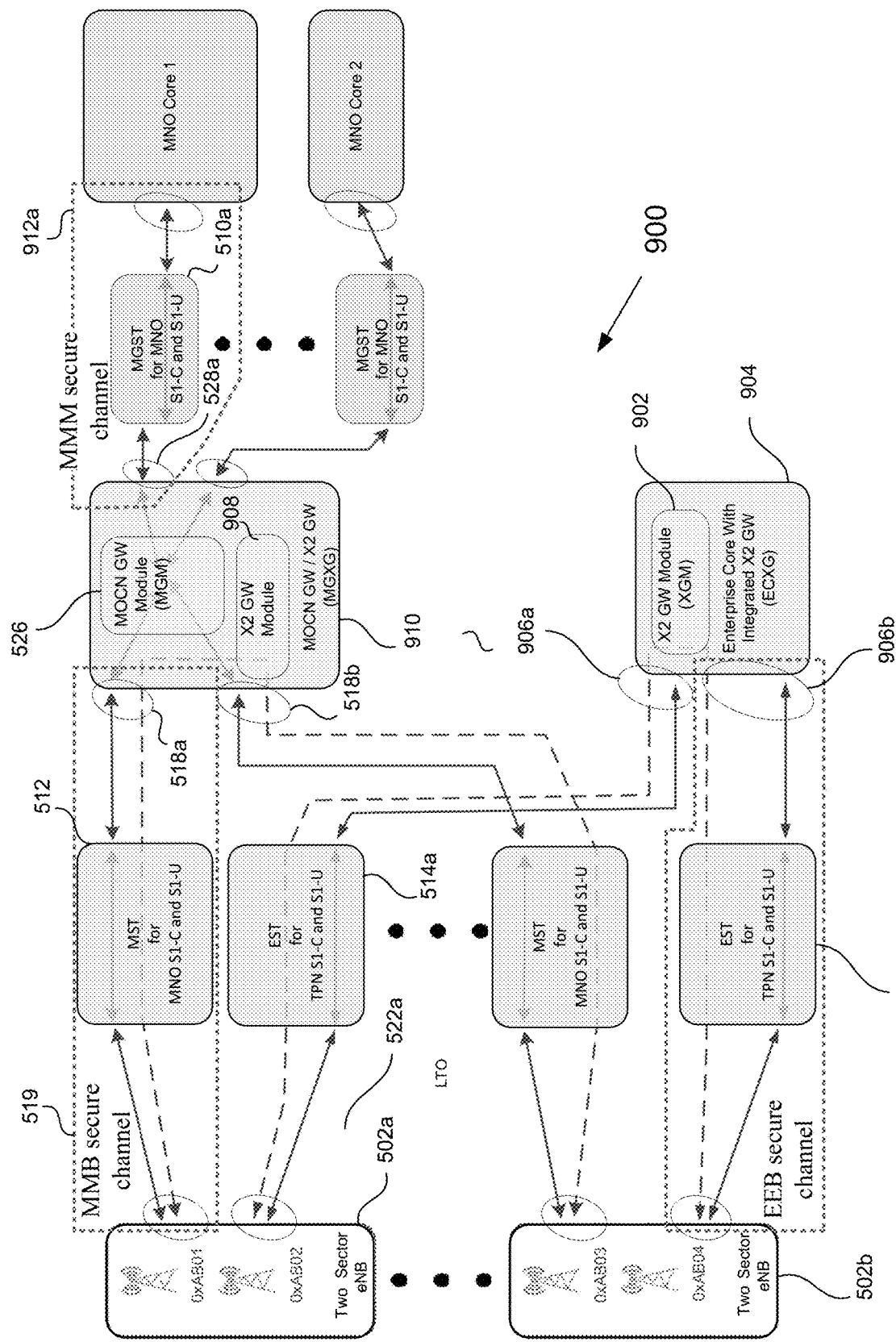
FIG. 9 is an illustration of an architecture in which X2 mobility functionality for an enterprise network is provided by an XGM within an enterprise core with Integrated X2 GW (ECXG).

FIG. 9 is an illustration of an architecture 900 in which the X2 mobility functionality for the enterprise network is provided by an XGM 902 within an E-core with Integrated X2 GW (ECXG) 904. In this architecture 900, user-plane and control-plane traffic for both the MNO network and the enterprise network flow in the same way as in the architecture 500 shown in FIG. 5, as does X2 mobility traffic for the MNO network. However, X2 mobility traffic for the enterprise network, while sent from the BS/AP 502 to the BS Portal 906 of the ECXG 904 through the EEB Secure Channel 514, the X2 traffic is sent to the XGM 902 within the ECXG 904, rather than to the XGM 908 in the MGXG 910. In some embodiments, the XGM 902 processes one or more X2 packets contained in the X2 traffic and determines whether to send one or more X2 packets to one of the other BS/APs 502 in the architecture 900. In some embodiments, this decision is based on whether there is to be a change in the BS/AP 502 through which a UE 101 will communicate with the various cores in the architecture 900 or to otherwise manage and/or control X2 mobility among the BS/APs 502. In some embodiments, the packets sent to from a first BS/AP 502 are simply relayed on to the second BS/AP 502. Alternatively, the XGM 902 in the ECXG 904 generates new X2 packets to send to the second BS/AP 502. In any case, this architecture 900 reduces the need for a secure tunnel from the E-core to the MGXG 910, but requires the E-core to have an integrated XGM, thus increasing the complexity of the E-core. Such tradeoffs will provide benefits that depend upon the particular use case and the users.

Figure 10:
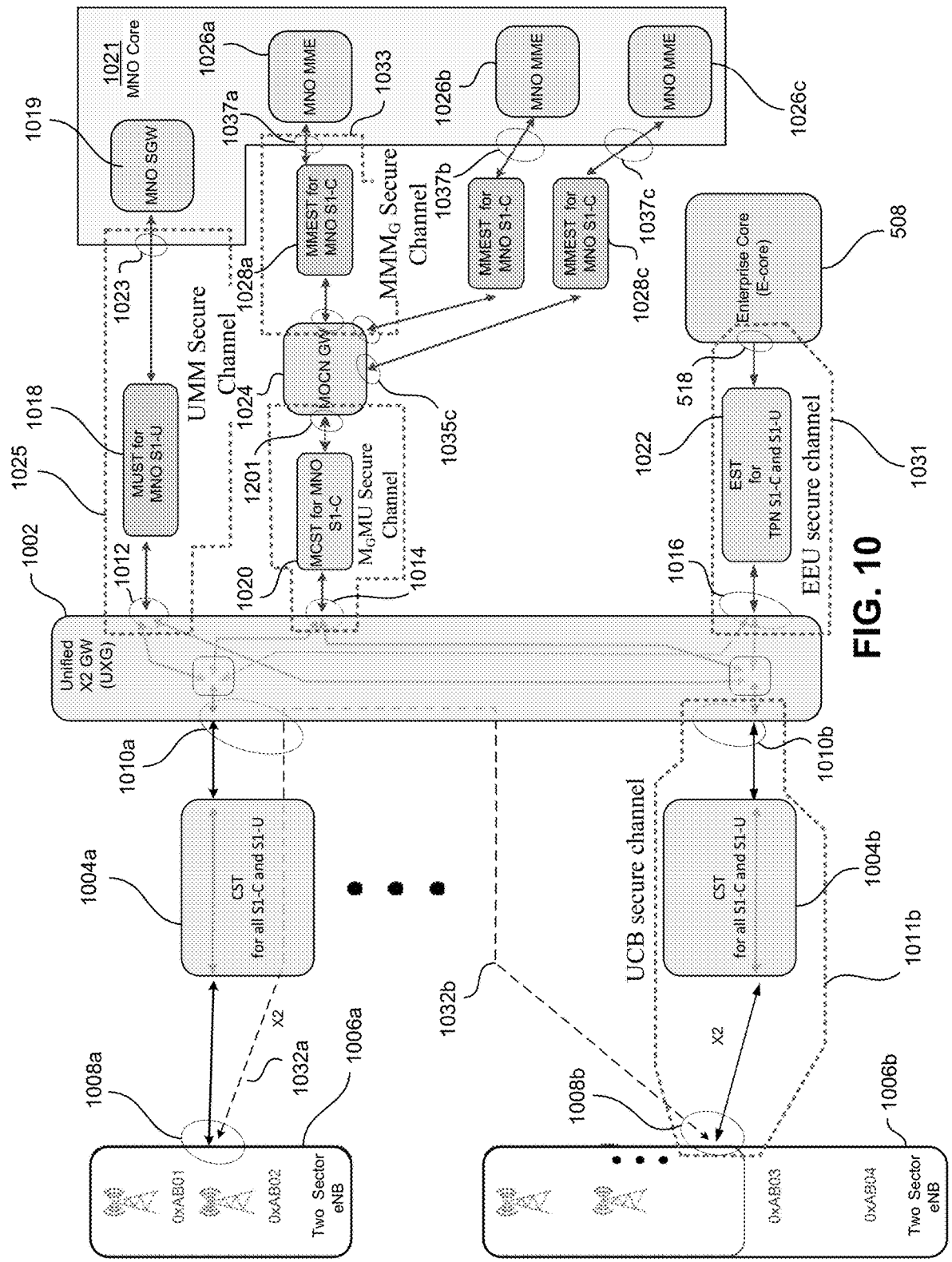
FIG. 10 illustrates an architecture in which a discrete Unified X2 Gateway (UXG) is provided independent of the cores.

FIG. 10 illustrates an architecture 1000 in which a discrete Unified X2 Gateway (UXG) 1002 is provided independent of the cores. All communications between a BS/AP 1006 and the UXG 1002 occur through a UCB (UXG-CTS-BS/AP) secure channel 1011. A Common Portal 1008 of the BS/AP 1006, a Common Secure Tunnel (CST) 1004 and a BS Portal 1010 of the UXG 1002 form the UCB Secure Channel 1011. The Common Portal 1008, CST 1004 and BS Portal 1010 of one UCB Secure Channel have a one-to-one correspondence such that each is associated with only one of each of the other two. For example, in the UCB Secure Channel 1011*b*, the common portal 1008*b* is only associated with the CST 1004*b* and the BS Portal 1010*b*, each of which is only associated with the common portal 1008*b* and with the other. In some embodiments in which the BS/AP 1006 has only one Common Portal 1008, the UCB Secure Channel 1011 can be said to comprise the BS/AP 502, associated CST 1004 and associated BS Portal 1010 in a one-to-one correspondence.

The UXG 1002 determines whether packets received at each BS Portal 1010 are intended for an E-core 508 or an MNO core 506 (i.e., are enterprise traffic or MNO traffic). Upon making the determination, the UXG 1002 sends user-plane (S1-U) MNO traffic to a U-Portal 1012, MNO control-plane (S1-C) traffic to an S1-C Portal 1014 of the UXG 1002, and enterprise traffic (both S1-C and S1-U) to a Enterprise Portal 1016 of the UXG 1002.

The U-Portal 1012, an MNO S1-U Secure Tunnel (MUST) 1018 and an MUST Portal 1023 form a UMM (UXG-MUST-MNO core) Secure Channel 1025 for MNO S1-U traffic between the UXG 1002 and the MNO core 1021. In particular, the Secure Channel 1025 establishes secure communications with a Serving Gateway (SGW) 1019 within an MNO core 1021. Accordingly, the MUST Portal 1023 is coupled to the SGW 1019. For user-plane packets, a bearer has been established, therefore the packets are simply routed to the SGW 1019 over the established bearer which flows through the MUST 1018. Therefore, no consolidation of traffic occurs. Accordingly, the user-plane traffic from the UXG 1002 can be sent directly through the MUST 1018 to the SGW 1019.

The S1-C Portal 1014, an MNO S1-C Secure Tunnel (MCST) 1020 and a MCST Portal 1027 of a MOCN GW 1024 form an MGMU (MOCN GW-MCTS-UXG) Secure Channel 1030 between the UXG 1002 and the MOCN GW 1024 to ensure secure communication for MNO S1-C traffic. Unlike the user-plane packets, control-plane packets can be consolidated by the MOCN GW 1024. That is, packets arriving from different BS/APs 1006 that are intended to be received by the same MME 1026 can be sent by the MOCN GW 1024 in the same capsule through an MME Secure Tunnel (MMEST) 1028. The MOCN GW 1024 determines to which, from among a plurality of MNO networks and MMEs 1026 within each MNO core 1021, to send control-plane packets.

Upon making the determination, the MOCN GW 1024 sends the packets together with any other packets for that MME 1026 on an MMMG Secure Channel 1033, each MMMG Secure Channel comprising one MNO Portal 1035 of an MOCN GW 1024, one MMEST 1028 and one MOCN GW Portal 1037 of an MNO core 1021. In some embodiments, the MOCN GW 1024 has a plurality of MNO Portals 1035, each dedicated to providing an interface to one MNO MME 1026. Furthermore, in some embodiments, the MNO core 1021 has a plurality of MOCN GW Portals 1037, each of which provide an interface through which traffic sent over an associated MMMG Secure Channel 1033 can be provided to one MNO MME 1026 from among a plurality of MMEs 1026 within the MNO core 1021. In the example shown, three such MNO MMEs 1026 are shown. Accordingly, each MNO MME 1026 has a unique dedicated MMMG Secure Channel 1033. It should be noted that since the MOCN GW 1024 determines to which MME 1026 particular packets are to be sent, the BS/AP 1006 is relieved of that function. Thus, the same capsule can be used to send all of MNO control-plane packets from the BS/AP 1006 to the MOCN GW 1024 regardless of the particular MNO core and MME in which the packets are intended to be received.

In addition, an EEU (E-core-EST-UXG) Secure Channel 1031 comprises an Enterprise Portal 1016 within the UXG 1002 an EST 1022 and a BS Portal 518 of the E-core 508. The EST 1022 carries enterprise traffic (both S1-C and S1-U). The user-plane and control-plane traffic are both terminated/originated at the E-core that receives/transmits traffic through a BS Portal 518 of the E-core 508. Each Enterprise Portal 1016 is associated with a unique EST 1022 and BS Portal 518 in a one-to-one relationship to form the EEU Secure Channel 1031 for communications between the UXG 1002 and the MNO Core 1021.

X2 mobility traffic for both the MNO network and the enterprise network flow through the UCB Secure Channel 1011. The UXG 1002 provides management and control of mobility for both the MNO network and the enterprise network. X2 mobility traffic flows between each BS/AP 1006 and the UXG 102 through the particular CST 1004 associated with the BS/AP 1006 through which a UE 101 is currently communicating. The UXG 1002 can provide all necessary communications to any other BS/AP 1006 involved in a mobility function, such as changing the BS/AP 1006 through which a UE 101 is communicating. The path between the BS/AP 1006 and the UXG 1002 is shown by a broken black line 1032. The line 1032 illustrates that a packet originating in one BS/AP 1006*a* can be communicated securely through the CST 1004*a* to the SB Portal 1010*a* of the UXG 1002. The UXG 1002 then sends that packet (either with or without processing the packet information) to through the BS Portal 1010*b* of the UXG 1002 to another BS/AP 1006*b* through the CST 1004*b*. In some embodiments, the packet that originated at the first BS/AP 1006*a* may not be the packet that is sent to the second BS/AP 1006*b*. That is, the UXG 1002 may receive and process the packet that originated at the first BS/AP 1006*a* and send a different packet to the second BS/AP 1006*b*. In some such embodiments, the packet that the UXG 1002 sends to the second BS/AP 1006*b* includes instructions for the operation of the BS/AP 1006*b* during a mobility function that the UXG 1002 is performing involving the two BS/APs 1006. In some embodiments, the X2 packet that is sent by the UXG 1002 is generated in response to the X2 packet that was received by the UXG 1002.

Figure 11:
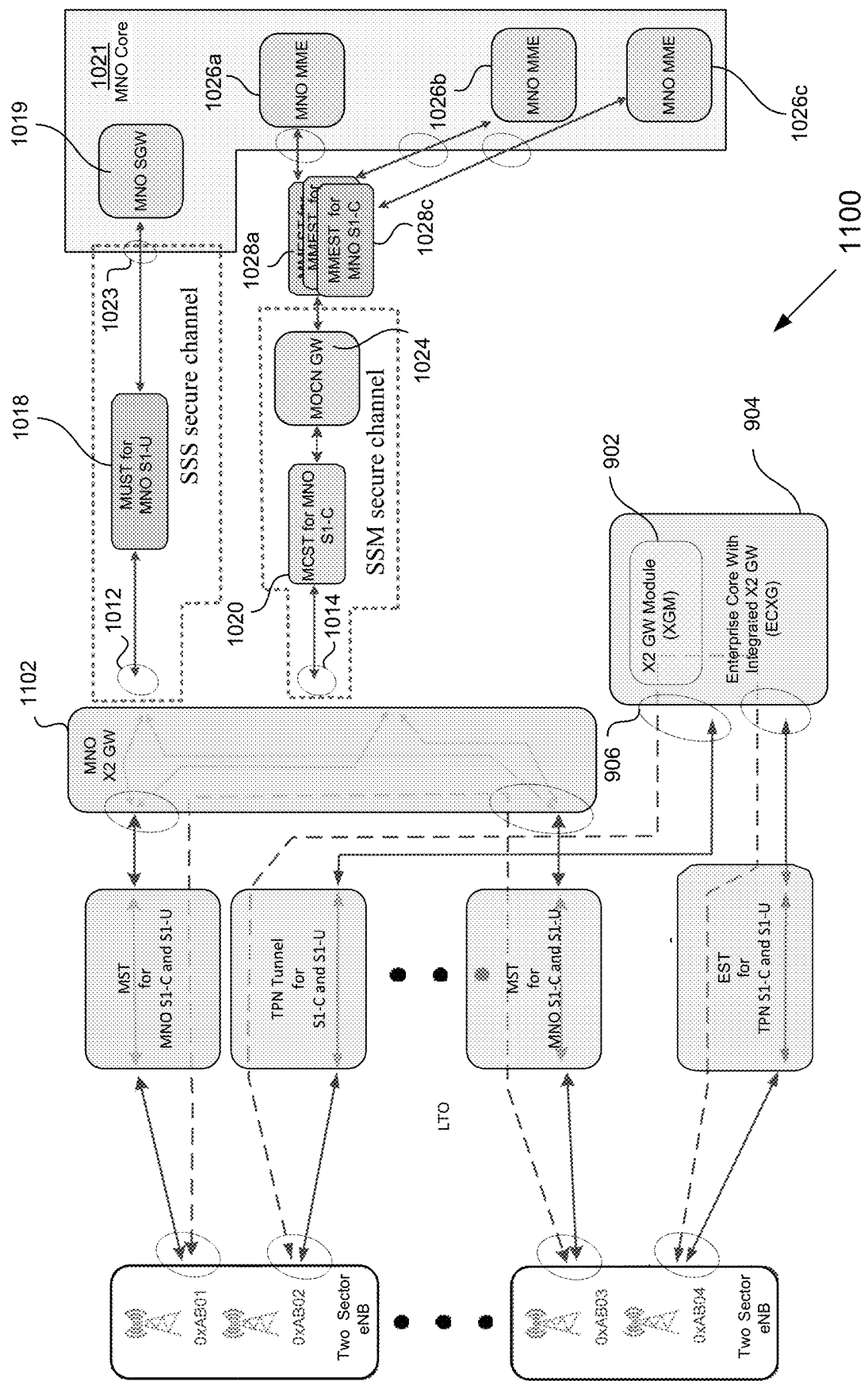
FIG. 11 is an illustration of another architecture in which an MNO X2 GW (MXG) is provided for mobility functionality related to the MNO network traffic and mobility functionality related to the enterprise network traffic is managed by an X2 GW integrated into an ECXG.

FIG. 11 is an illustration of another architecture 1100 in accordance with an embodiment of the disclosure method and apparatus. In the architecture 1100, an MNO X2 GW (MXG) 1102 is provided for mobility functionality related to the MNO network traffic. However, mobility functionality related to the enterprise network traffic is managed by an X2 GW 902 that is integrated into an ECXG 904 similar to the ECXG 904 disclosed above with respect to FIG. 9. In this architecture 1100, the MNO packets flow as noted with respect to the architecture 1000 described above, but enterprise packets flow as noted with respect to the architecture 900 described above. This is true for both user-plane traffic, control-plane traffic and X2 mobility traffic.

Figure 12:
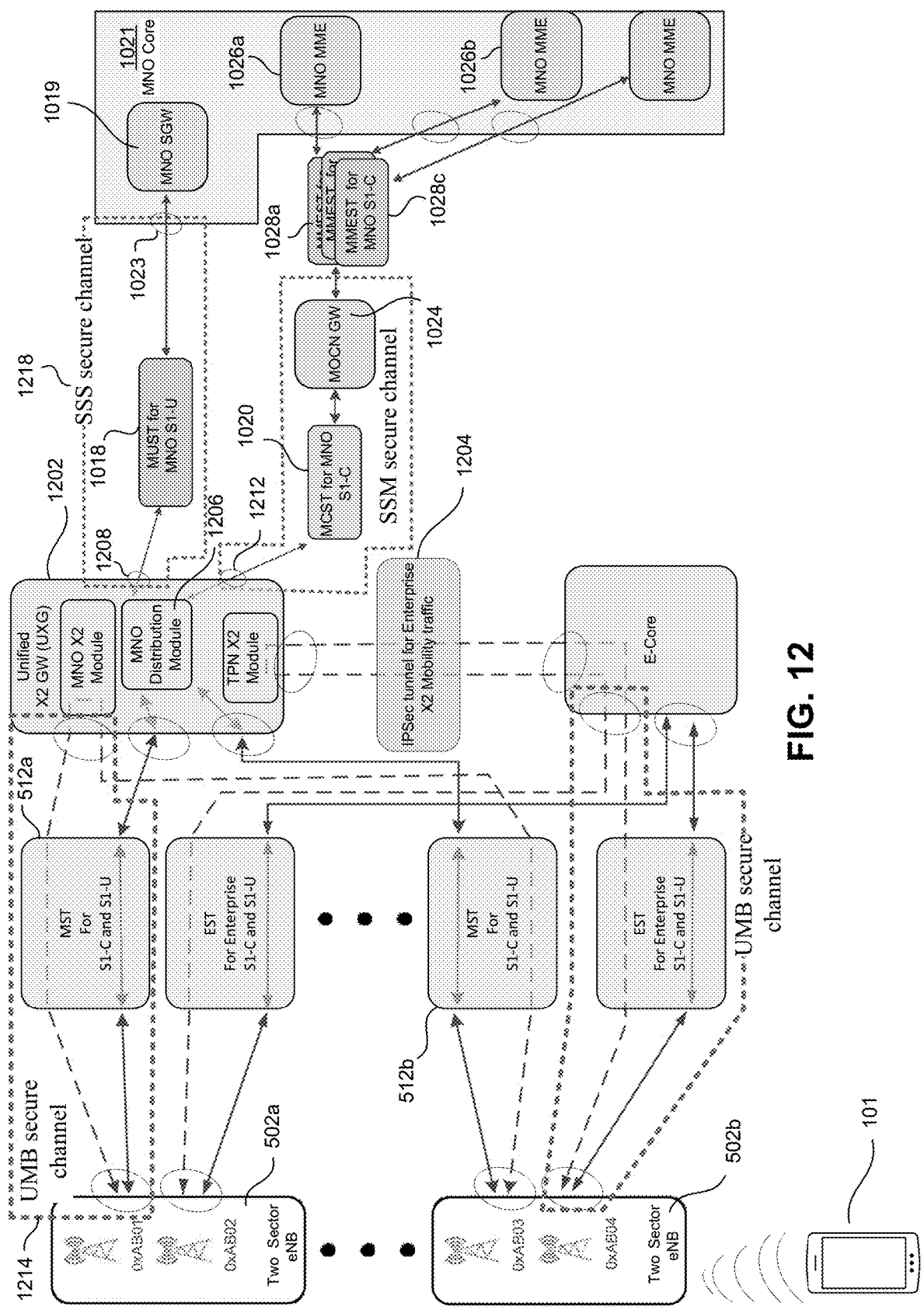
FIG. 12 is an illustration of an architecture in which a UXG manages and coordinates X2 functionality for both an MNO network and an enterprise network and each BS/AP has a separate MNO Secure Tunnel (MST) for MNO traffic and an Enterprise Secure Tunnel (EST) for enterprise traffic to and from the BS/AP.

FIG. 12 is an illustration of an architecture 1200 in which a UXG 1202 manages and coordinates X2 functionality for both the MNO network and for the enterprise network, similar to the case in the architecture 1000 of FIG. 10. However, in contrast to the architecture 1000 shown in FIG. 10, each BS/AP 502 in the architecture 1200 has an MST 512 for MNO traffic and an EST 514 for enterprise traffic to and from the BS/AP 502. MNO traffic (i.e., user-plane traffic, control-plane traffic and X2 mobility traffic) between the BS/APs 502 and the UXG 1202 flows essentially the same as the MNO traffic that flows through the architecture 500. In addition, enterprise traffic between the BS/APs 502 and the E-core 508 (i.e., user-plane traffic, control-plane traffic and X2 mobility traffic) flows essentially the same as the enterprise traffic described above with respect to the architecture 500. Packets originating at a BS/AP 502 are securely communicated to the UXG 1202 over a UMB (UXG-MST-BS/AP) Secure Channel 1214. Each UMB Secure Channel 1214 comprises one MNO Portal 530 in one of the BS/APs 502, an associated MST 512 and an associated BS Portal 1210 of the UXG 1202. Each UMB Secure Channel 1214 allows secure communications to occur between one BS/AP 502 and the UXG 1202.

Packets communicated from a BS/AP 502 to the UXG 1202 are sent to an MNO Distribution Module 1206 within the UXG 1202. The MNO Distribution Module 1206 determines whether the packets are part of a user-plane flow or a control-plane flow. The MNO distribution Module 1206 directs user-plane packets to a U-Portal 1208 of the UXG 1202. One U-Portal 1208, one MUST 1018 and one MUST Portal 1023 of the MNO core 1021 form a UMM (UXG-MUST-MNO core) Secure Channel 1218. The UMM Secure Channel allows secure communications to be send between the UXG 1202 and the MNO core 1023. User-plane packets arriving at the MNO core 1023 via the UMM Secure Channel are sent to a MNO SGW 1019 within the MNO core 1021.

Control-plane packets are directed to a C-Portal 1212 of the UXG 1202. The C-Portal 1212 of the UXG 1202, the MCST 1020 and a MCST Portal 1029 in the MOCN GW 1024 form a UMMG Secure Channel for the control-plane traffic to the MNO core 1021. The MOCN GW 1024 consolidates control-plane packets that are intended for the same MNO MME 1026 and sends them through the appropriate MMEST 1028 to securely communicate them to the MNO MME 1026.

For enterprise network X2 mobility traffic, there is a need for an XST 1204 to establish secure communications between the E-core 508 and the MXG 1102. The enterprise X2 mobility traffic flows between the E-core 508 and the UXG 1202 through an XST 516, similar to the X2 mobility traffic in the architecture 500.

In the architecture 1200, the UXG 1202 has an MNO Distribution Module 1206 that sends the MNO user-plane traffic to, and receives user-plane traffic from, a U-Portal 1208 of the UXG 1202. The U-Portal 1208 provides access to an MUST 1018. The MUST 1018 establishes secure communications between the UXG 1202 and the MNO SGW 1019 within the MNO core 1021.

The MNO Distribution Module 1206 also sends control-plane traffic to a MCST 1020 that established secure communications between the UXG 1202 and a MOCN GW 1024. The MOCN GW 1024 determines which MNO MME 1026 to send packets to and securely communicates with MNO MMEs 1026 within the MNO core 1021 through a MMEST 1028. Packets received from the MNO MMEs 1026 that are intended for the same BS/AP 502 are consolidated within the MOCN GW 1024 and sent back through the MCST 1020 to the UXG 1202. Those packets are then sent through a BS Portal 1210 of the UXG 1202. Each BS Portal 1210 is configured to communicate through a unique MST 512 to provide secure communications to a corresponding one of the BS/APs 502.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A MOCN Gateway/X2 Gateway (MGXG) comprising:
  a) a Base Station (BS) Portal configured to receive communications from, and transmit communications to, at least one Base Station/Access Point (BS/AP) through at least one Mobile Network Operator (MNO) Secure Tunnel (MST), wherein each of the at least one MSTs has a one to one correspondence with an associated one of the at least one BS/APs;
  b) a MNO Portal configured to receive communications from, and transit communication to, at least one MNO core through at least one MOCN GW Secure Tunnel (MGST), wherein each of the at least one MGSTs has a one to one correspondence with an associated one of the at least one MNO cores;
  c) a X2 Portal configured to receive communications from, and transmit communication to, an E-core through an X2 Secure Tunnel (XST); and
  d) a MOCN GW Module (MGM) configured to:
    i. receive BS/AP intended communications (BICs) from a transmitting MNO core from among the at least one MNO cores, the BICs received through the MNO Portal and via the MGST associated with the transmitting MNO core;
    ii. route such received BICs to an intended BS/AP, from among the at least one BS/APs, through the BS Portal and via the MST associated with the intended BS/AP;
    iii. receive MNO core intended communications (MICs) from a transmitting BS/AP from among the at least one BS/APs, the MICs received through the BS Portal and via the MST associated with the transmitting BS/AP; and
    iv. route such received MICs to an intended MNO core from among the at least one MNO cores through the MNO Portal and via the MGST associated with the intended MNO core.

2. A MOCN Gateway/X2 Gateway (MGXG) comprising:
  a) a Base Station (BS) Portal configured to receive communications from, and transmit communications to, at least one Base Station/Access Point (BS/AP) through at least one Mobile Network Operator (MNO) Secure Tunnel (MST), wherein each of the at least one MSTs has a one to one correspondence with an associated one of the at least one BS/APs;
  b) a MNO Portal configured to receive communications from, and transit communication to, at least one MNO core through at least one MOCN GW Secure Tunnel (MGST), wherein each of the at least one MGSTs has a one to one correspondence with an associated one of the at least one MNO cores;
  c) a X2 Portal configured to receive communications from, and transmit communication to, an E-core through an X2 Secure Tunnel (XST); and
  d) an X2 GW Module (XGM) configured to:
    i) receive BS/AP originated communications (BOCs) through the X2 Portal via the XST, the BOCs originating in a first of the at least one BS/APs;
    ii) in response to the received BOCs, generating a message to a second of the at least one BS/APs, the message indicating a change in assignment as to which BS/AP is servicing a User Equipment (UE); and
    iii) transmitting to the second BS/AP the generated message through the X2 Portal via the XST.

3. The MGXG of claim 2, wherein the received BOC traverses an enterprise Secure Tunnel (EST) and an E-core along a path from the first BS/AP to the X2 Portal of the MGXG.

4. The MGXG of claim 2, wherein the XGM is further configured to control and manage which of the at least one BS/APs provides service to UEs attempting to gain access to at least one of: (1) the at least one MNO cores; and (2) an E-core coupled to the XST.

5. A MGXG comprising:
  a) a BS Portal configured to receive communications from, and transmit communications to, at least one BS/AP through at least one Common Secure Tunnel (CST), wherein each of the at least one CSTs has a one to one correspondence with an associated one of the at least one BS/APs;
  b) an MNO Portal configured to receive communications from, and transit communication to, at least one MNO core through at least one MGST, wherein each of the at least one MGSTs has a one to one correspondence with an associated one of the at least one MNO cores;
  c) an Enterprise Portal configured to receive communications from, and transit communication to, at least one E-core through at least one EST, wherein each of the at least one ESTs has a one to one correspondence with an associated one of the at least one E-cores; and d) an MGM configured to:
   i) receive BS/AP intended communications (BICs) from a transmitting MNO core from among the at least one MNO cores, the BICs received through the MNO Portal and via the MGST associated with the transmitting MNO core;
   ii) route such received BICs to an intended BS/AP from among the at least one BS/APs through the BS Portal of the MGXG and via the CST associated with the intended BS/AP;
   iii) receive MNO core intended communications (MICs) from a transmitting BS/AP from among the at least one BS/APs, the MICs being received through the BS Portal of the MGXG and the CST associated with the transmitting BS/AP;
   iv) route such received MNO core intended communications to an intended MNO core from among the at least one MNO cores through the MNO Portal of the MGXG and via the MGST associated with the intended MNO core;
   v) receive BICs from a transmitting E-core from among the at least one E-cores, the BICs received through the Enterprise Portal and via the EST associated with the transmitting E-core;
   vi) route such received BICs to an intended BS/AP from among the at least one BS/APs through the BS Portal of the MGXG and via the CST associated with the intended BS/AP;
   vii) receive E-core intended communications (EICs) from a transmitting BS/AP from among the at least one BS/APs, the EICs received through the BS Portal of the MGXG and via the CST associated with the transmitting BS/AP; and
   viii) route such received EICs to an intended E-core from among the at least one E-cores through the Enterprise Portal and CST associated with the intended E-core.

6. The MGXG of claim 5, further comprising an XGM configured to receive a BS/AP originated UE assignment message from an originating BS/AP through the BS Portal and CST associated with the originating BS/AP and route the UE assignment message through the BS Portal to a destination BS/AP via the CST.

7. The MGXG of claim 6, wherein the XGM is further configured to control and manage which of the at least one BS/APs provides service to UEs attempting to gain access to at least one of the at least one MNO cores and/or at least one of the at least one E-cores.

8. A MGXG comprising:
a) a BS Portal configured to receive communications from, and transmit communications to, at least one BS/AP through at least one Common Secure Tunnel (CST), wherein each of the at least one CSTs has a one to one correspondence with an associated one of the at least one BS/APs;
b) an MNO Portal configured to receive communications from, and transit communication to, at least one MNO core through at least one MGST, wherein each of the at least one MGSTs has a one to one correspondence with an associated one of the at least one MNO cores; and
c) an Enterprise Portal configured to receive communications from, and transit communication to, at least one E-core through at least one E-core Secure Tunnel (EST), wherein each of the at least one ESTs has a one to one correspondence with an associated one of the at least one E-cores, wherein packets originating at a first BS/AP and intended for one of the at least one MNO cores are communicated to the MOCN GW through the same CST as packets originating at the first BS/AP and intended for one of the at least one E-core.

9. A wireless communications network comprising:
a) a MGXG comprising:
   i. a plurality of MST Portals, each MST Portal associated with a corresponding MST and a corresponding BS/AP to form a unique MMB Secure channel and configured to receive packets of data from, and transmit packets of data to, the corresponding BS/AP through corresponding MST;
   ii. at least one MNO Portal, each MNO Portal associated with a corresponding MGST and a corresponding MNO core to form a unique MMM Secure channel and configured to receive information from, and transmit packets of data to, the corresponding MNO core through the corresponding MGST;
   iii. a MGM coupled to the each of the BS Portals and to the at least one MNO Portal, the MGM configured to:
      1. Receive MNO core intended communications (MICs) from the corresponding BS/APs;
      2. Determine which MNO core, from among the corresponding MNO cores, to transmit the MICs;
      3. Transmit the received MICs to the determined MNO core through the unique MMM Secure channel comprising the determined MNO core;
      4. Receive BS/AP intended communications (BICs) from one of the corresponding MNO cores;
      5. Determine which BS/AP, from among the corresponding BS/APs, to transit the received BICs; and
      6. Transmit the received BICs through the unique MMB Secure channel comprising the determined BS/AP; and
   iv. a MOCN XGM coupled to the plurality of BS Portals and configured to:
      1. Receive first X2 packets from a first of the BS/APs via a first of the MMB Secure channels;
      2. Determine, based on the received first X2 packets, second X2 packets are to be sent to a second of the BS/APs; and
      3. Transmit the second X2 packets to the second of the BS/APs via a second of the MMB Secure channels; and
b) an E-core with integrated X2 gateway (ECXG) comprising:
   i. a plurality of BS Portals, each configured to be coupled to a corresponding EST and associated with a corresponding BS/AP to form a unique EEB Secure Channel and the BS Ports further configured to receive packets of data from, and transmit packets of data to, the corresponding BS/AP through the corresponding EST; and
   ii. an enterprise XGM configured to be coupled to the plurality of BS Portals and configured to:
      1. Receive first X2 packets from a first of the corresponding BS/APs via a corresponding EST in first of the EEB Secure Channels;
      2. Determine, based on the received first X2 packets that second X2 packets are to be sent to a second of the corresponding BS/APs; and
      3. Transmit the second X2 packets to the second of the corresponding BS/APs via a corresponding EST in a second of the EEB Secure Channels.

10. The wireless communications network of claim 9, wherein the second X2 packets transmitted by the MOCN XGM are essentially the same as the first X2 packets received by the MOCN XGM.

11. The wireless communications network of claim 9, wherein the second X2 packets transmitted by the enterprise XGM are essentially the same as the first X2 packets received by the enterprise XGM.

12. A unified X2 GW comprising:
  a) a plurality of BS Portals, each configured to be coupled to a corresponding Common Secure Tunnel (CST) and associated with a corresponding BS/AP in a one-to-one relationship to form a unique UCB (Unified X2 Gateway-CTS-Base station/access point) Secure channel, each BS Portal configured to receive packets of data from, and transmit packets of data to, the corresponding BS/AP through the corresponding CST;
  b) a plurality of Enterprise Portals, each configured to be coupled to a corresponding EST and associated with a corresponding E-core to form a unique EEU (E-core-EST-UXG) Secure channel, each Enterprise Portal configured to receive packets of data from, and transmit packets of data to, the corresponding E-core through the corresponding EST;
  c) an S1-C Portal configured to communicate through a corresponding MNO S1-C Secure Tunnel (MCST) and associated with a corresponding MOCN GW to form a unique SMM Secure channel, the S1-C Portal configured to receive packets of data from, and transmit packets of data to, the corresponding MOCN GW through the corresponding SST; and
  d) a plurality of S1-U Portals, each configured to be coupled to a corresponding S1-U Secure Tunnel (SUST) and associated with a corresponding Serving Gateway (SGW) to form a unique SSS Secure channel, each S1-U Portal configured to receive packets of data from, and transmit packets of data to, the corresponding SGW through the corresponding SUST.

13. A wireless communications network comprising:
  a) a MOCN X2 GW comprising:
    i. a plurality of MST Portals, each MST Portal associated with a corresponding MST and a corresponding BS/AP to form a unique MMB Secure channel and configured to receive packets of data from, and transmit packets of data to, the corresponding BS/AP through corresponding MST;
    ii. an S1-C Portal configured to be coupled to a corresponding S1-C Secure Tunnel (SST) and associated with a corresponding MOCN GW to form a unique SSM Secure channel, the S1-C Portal configured to receive packets of data from, and transmit packets of data to, the corresponding MOCN GW through the corresponding SST; and
    iii. a plurality of S1-U Portals, each configured to be coupled to a corresponding S1-U Secure Tunnel (SUST) and associated with a corresponding Serving Gateway (SGW) to form a unique SSS Secure channel, each S1-U Portal configured to receive packets of data from, and transmit packets of data to, the corresponding SGW through the corresponding SUST;
  b) a TP Core comprising:
    i. a plurality of EST Portals, each configured to be coupled to a corresponding EST and associated with a corresponding BS/AP to form a unique EEB Secure Channel and the EST Ports further configured to receive packets of data from, and transmit packets of data to, the corresponding BS/AP through the corresponding EST; and
    ii. a TP XGM configured to be coupled to the plurality of EST Portals and configured to: (1) receive X2 packets from a first of the corresponding BS/APs via a corresponding EST in first of the EEB Secure Channels; (2) determine that a UE being serviced by a first of the corresponding BS/APs is to be serviced by a second of the corresponding BS/APs; and (3) transmit an X2 packet to the second of the corresponding BS/APs via a corresponding EST in a second of the EEB Secure Channels to allow the transfer of service to the second of the BS/APs.

14. A Unified X2 GW comprising:
  i. a plurality of MST Portals, each MST Portal associated with a corresponding MST and a corresponding BS/AP to form a unique MMB Secure channel and configured to receive packets of data from, and transmit packets of data to, the corresponding BS/AP through corresponding MST;
  ii. an S1-C Portal configured to be coupled to a corresponding S1-C Secure Tunnel (SST) and associated with a corresponding MOCN GW to form a unique SSM Secure channel, the S1-C Portal configured to receive packets of data from, and transmit packets of data to, the corresponding MOCN GW through the corresponding SST;
  iii. a plurality of S1-U Portals, each configured to be coupled to a corresponding S1-U Secure Tunnel (SUST) and associated with a corresponding Serving Gateway (SGW) to form a unique SSS Secure channel, each S1-U Portal configured to receive packets of data from, and transmit packets of data to, the corresponding SGW through the corresponding SUST; and
  iv. a X2 Portal configured to receive communications from, and transit communication to, an E-core through an XST.

* * * * *